UNITED STATES PATENT OFFICE.

WILLIAM N. BLAKEMAN, JR., OF MOUNT VERNON, NEW YORK.

PAINT COMPOSITION.

1,375,353.           Specification of Letters Patent.    Patented Apr. 19, 1921.

No Drawing.       Application filed June 12, 1917. Serial No. 174,254.

*To all whom it may concern:*

Be it known that I, WILLIAM N. BLAKEMAN, Jr., a citizen of the United States, and resident of the city of Mount Vernon, in the county of Westchester and State of New York, have invented a new and useful Paint Composition, which invention is fully set forth in the following specification.

The object of this invention is to improve the spreading and accelerate the drying of all pigments which are refractory to oil-vehicles; and the invention will first be described in detail and then set forth in the claims.

It is well known that many of the anhydrous pigments—that is pigments which carry no combined water—particularly the white pigments will neither spread satisfactorily nor dry with facility when ground in the usual linseed or other oil-vehicle. But I have discovered that when an anhydrous pigment is ground with an hydrogenated oil, the mixture will follow the brush in a smooth, uniform and homogeneous film; and while this film will be slow in drying, the drying will be accelerated by the addition of a drying oil, such as tung-oil, or a semi-drying-oil, such as marine animal oil, or a combination of both.

The process of hydrogenation of oils is a progressive one, and can be carried on from an incipient attack with hydrogen to full saturation or solidification, with a gradual reduction in general of both refractive index and specific gravity.

In carrying out my invention the entire mass of oil-vehicle with which the pigment is to be combined may be hydrogenated, but as the varying character of the pigments will require varying degrees of hydrogenation it will be found more satisfactory, instead of hydrogenating the whole mass of vehicle, to incorporate therein a hydrogenated oil. In this way, hydrogenated oil of a standardized specific gravity may be employed and a sufficient quantity of it used to affect the varying pigments without attempting to hydrogenate the entire oil-vehicle to the same efficacious point.

The hydrogenated oil may be employed in the condition in which it exists at any stage of the process of hydrogenation, but the best effects will result from the use of a hydrogenated oil which still continues to flow, at common temperatures, after a run with hydrogen on catalysts, for a half ($\frac{1}{2}$) or three-quarters ($\frac{3}{4}$) of an hour, and has the appearance of chilled honey, or thick sugar syrup. If a very thick or solidified, hydrogenated oil be used, it is liable to chill out from the vehicle and precipitate.

Any of the hydrogenated oil can be used, such as linseed, soja bean, cotton seed, menhaden, whale, seal, and the like; and although hydrogenated oil mixed with its parent oil—for example hydrogenated linseed-oil-hydrogenate with linseed oil—will give the best effects in general, it may be found advantageous, for economical reasons, to use some of the other hydrogenated oils.

The percentage of hydrogenated oil to oil-vehicle will depend on the nature of the composition, and may be varied as required by practical conditions. If linseed oil be chosen as the vehicle, as little as five (5%) per cent. of hydrogenated oil will show a decided improvement in the spreading of mildly refractory pigments, while from fifteen (15%) to twenty (20%) per cent. may be used with pigments of a stubbornly resisting character.

The term zinc lead, used herein, refers to a class of pigments which have been on the market for many years and are well-known commercially under that name. They are all composed of zinc oxid and lead sulfate in varying proportions, the one which I prefer consisting, approximately, of 60 per cent. zinc oxid and 40 per cent. lead sulfate.

The following are examples of compositions which will give good results:—

(1.) Eighty (80) parts of linseed oil showing .9287 sp. gr., carrying fifteen (15%) per cent. of its own hydrogenated linseed oil showing .9219 sp. gr., when ground with one hundred (100) parts of a zinc-lead pigment (sixty (60%) per cent. zinc oxid and forty (40%) per cent. lead sulfate) with the usual quantity of commercial liquid drier, will firm or set in from twelve (12) to fifteen (15) hours, under favorable atmospheric conditions, and subsequently harden or indurate satisfactorily. If from six (6) to eight (8) parts of tung oil be added, the paint will firm or set in from six (6) to eight (8) hours; and if a mixture of half ($\frac{1}{2}$) tung oil and half ($\frac{1}{2}$) marine animal oil be used, instead of tung oil alone, the time of firming will be reduced to four (4) or five (5) hours.

(2.) Eighty (80) parts of linseed oil showing .9287 sp. gr.; fifteen (15%) per cent. of hydrogenated linseed oil showing .9219 sp. gr.; one hundred fifty (150) parts of barium sulfate (natural); and thirty (30) parts of zinc-lead (sixty (60%) per cent. zinc-oxid and forty (40%) per cent. lead sulfate), with the usual quantity of commercial liquid drier, will spread with great homogeneity, firm or set in sixteen (16) to eighteen (18) hours, and subsequently indurate satisfactorily.

(3.) Eighty (80) parts linseed oil, showing .9287 sp. gr.; fifteen (15%) per cent. hydrogenated linseed oil showing .9219 sp. gr.; fifteen (15%) per cent. tung oil; fifteen (15%) per cent. marine animal oil; one hundred fifty (150) parts barium sulfate (natural); and thirty (30) parts zinc-lead carrying sixty (60%) per cent. zinc oxid and forty (40%) per cent. lead sulfate; with the usual quantity of commercial liquid drier, will firm in four (4) or five (5) hours, and subsequently indurate in a satisfactory manner.

For all tinted and dark colors, this formula, with slight variations, will be found satisfactory as a most economical and permanent protective covering.

A small percentage—say from one-half of one ($\frac{1}{2}$ of 1%) per cent. to three (3%) per cent. of one or more of the animal, vegetable, or mineral residuals, fats, waxes, stearins, still-ends, and the like, may be added to the mixture if desired, and they will be found to act as a repellent agent and render the surface of the paint-film more repellent to atmospheric and abrasive influences. Any suitable commercial liquid drier may be used. All the oil factors in the oil-vehicle, must, for the best effects, be water free.

The oil-vehicle above described, is claimed in another application filed herewith and bearing the Serial Number 174,253.

Having thus fully described my invention, I claim:—

1. As a new composition of matter, a mixture of a soft and flowing hydrogenated oil, and an anhydrous pigment, the mixture being devoid of water, free or combined.

2. A mixture of an oil-vehicle; a soft and flowing hydrogenated oil; and an anhydrous pigment; the mixture being devoid of water, free or combined.

3. A mixture of an oil-vehicle; a soft and flowing hydrogenated oil; a drying oil; and an anhydrous pigment; the mixture being devoid of water, free or combined.

4. A mixture of a soft and flowing hydrogenated oil; tung oil; and an anhydrous pigment; the mixture being devoid of water, free or combined.

5. A mixture of an oil-vehicle; a soft and flowing hydrogenated oil; tung oil; and an anhydrous pigment; the mixture being devoid of water, free or combined.

6. A mixture of an oil-vehicle; a soft and flowing hydrogenated oil; tung oil; another oil; and an anhydrous pigment; the mixture being devoid of water, free or combined.

7. A mixture of a soft and flowing hydrogenated oil; tung oil; marine animal oil; and an anhydrous pigment; the mixture being devoid of water, free or combined.

8. A mixture of an oil-vehicle; a soft and flowing hydrogenated oil; tung oil; marine animal oil; and an anhydrous pigment; the mixture being devoid of water, free or combined.

9. A mixture of linseed oil; soft and flowing hydrogenated linseed oil; and an anhydrous pigment; the mixture being devoid of water, free or combined.

10. A mixture of linseed oil; soft and flowing hydrogenated linseed oil; tung oil; and an anhydrous pigment; the mixture being devoid of water, free or combined.

11. A mixture of linseed oil; soft and flowing hydrogenated linseed oil; tung oil; marine animal oil; and an anhydrous pigment; the mixture being devoid of water, free or combined.

WM. N. BLAKEMAN, Jr.